Figure 1:
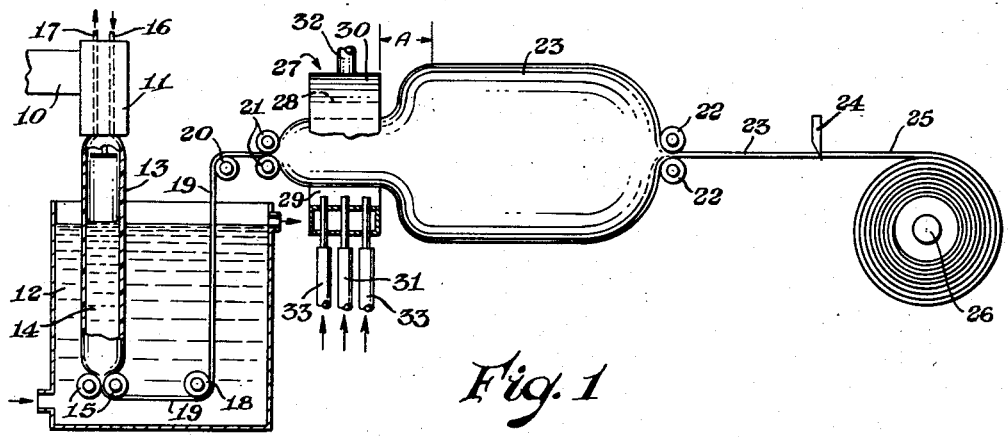

INVENTORS
John William McIntire
Kenneth G. Francis

BY Griswold & Burdick
ATTORNEYS

United States Patent Office 2,910,961
Patented Nov. 3, 1959

2,910,961

APPARATUS FOR PREVENTING BAG AND SAG IN ORIENTED PLASTIC FILM

John W. McIntire, Midland, and Kenneth G. Francis, Bay City, Mich., assignors to The Dow Chemical Company, Midland, Mich., a corporation of Delaware Original application March 1, 1956, Serial No. 568,855. Divided and this application August 22, 1958, Serial No. 757,646

1 Claim. (Cl. 118—308)

In those processes in which an organic thermoplastic is extruded as a tube or a sheet, the extruded product is stretched to effect orientation and produce a strong thin pellicle, and the pellicle or film is wound on a roll or core for storage or shipment, natural forces cause certain undesirable distortions in the rolled sheet which have been called in the trade "bag and sag." These distortions arise from the fact that the tightly rolled sheet material has a tendency to shrink slightly, but is unable to do so in a uniform manner because of the tendency of the contiguous surfaces of the rolled sheet to adhere to, rather than slip over one another. This results in nonuniform shrinkage both longitudinally and transversely. When such a pellicle is unwound from the roll, it is found to be incapable of lying straight and flat on a plane surface. The deviations from planarity and linearity, i.e., longitudinal curvature and cupped surfaces, are the undesirable distortions referred to above. These deviations make it difficult to produce smooth, dimensionally accurate articles from the pellicles and severely limit their commercial utility.

This invention relates to, and has for its main object the provision of an apparatus for preventing the described difficulties. The problem is especially acute in the production of "double wound" film or crystalline vinylidene chloride polymers, and the invention has particular importance to overcoming the stated problem with such film.

In the conventional procedure for making oriented pellicles of a crystalline vinylidene chloride polymer, the polymer is melted and extruded in tubular form downwardly into a cold water bath, to supercool the polymer, thence around guide rolls and out of the bath. The portion of the tube between the extrusion orifice and the first guide roll in the bath is partially filled with an inert liquid to keep the tube from collapsing before it is supercooled. Sometimes a dust, such as powdereed starch, is fed into the space between the orifice and the column of inert liquid within the tube and adheres to the inner wall of the tube to prevent coalescence between opposed inner surfaces when the tube is collapsed and flattened in passing around the guide rolls. Such dust becomes imbedded in the plastic surface and has the limited function of permitting the tube to be reopened. After leaving the bath, the supercooled tube is inflated between two sets of pinch rolls with enough air to expand the tube radially as fully as possible, usually from 3 to 5 times its original diameter. The second set of pinch rolls operates at from 2 to 4 times the peripheral speed of the first set, and effects a corresponding longitudinal orientation of the tubular pellicle. The tube is flattened in passing the second pinch rolls, the lateral folds are trimmed away, and the resulting two flat sheets may be wound together as "double wound film" or the plies may be separated and rolled individually as "single wound film." In the so-rolled state the shrinkage tendency mentioned above, which may be from a fraction of one percent to from 2 to 4 percent, is observed with its concomitant undesirable results.

According to the present invention, the stated disadvantages are obviated and straight, level film is obtained by applying an inert dust to the external surface of the film prior to its orientation. In consequence, whether the stretched film is wound as single or double plies, it has a freedom to slip while shrinking, the roll of film does not undergo strangulation of its inner layers due to contraction of the outer layers, and there is obtained a sheet free from "bag and sag," capable of lying stright and flat on a plane surface. Since a common use for plastic pellicles is in the wrapping of foods, the dust employed for such film should be starch or other harmless material, but for industrial uses of film it is sufficient that the dust employed be one which will permit the film surfaces to slip over one another without scratching. Thus, talc and powdered mica may be used in appropriate cases.

When practicing the invention in the preparation of crystalline vinylidene chloride polymer film made as described, the external application of dust is made after the tubular material emerges from the supercooling bath and before it has been inflated to effect radial orientation. A suitable apparatus for such purpose comprises a housing encircling the partially inflated supercooled tube, to which is fed a dust-laden stream of air. The plastic pellicles normally carry an electrostatic charge which attracts the dust from the air stream, resulting in a fairly uniform deposit of dust on the exterior wall of the tube.

Figure 2:
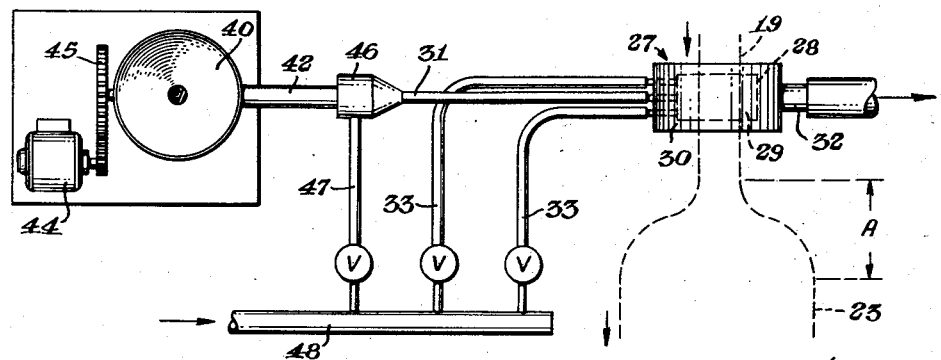

A preferred embodiment of dusting apparatus for use in the invention is shown schematically in the accompanying drawing, wherein:

Fig. 1 illustrates the film production process;
Fig. 2 shows a plan view of the dust applying apparatus; and
Fig. 3 is an elevation of the apparatus of Fig. 2.

Referring to Fig. 1, a normally crystalline vinylidene chloride polymer is melted in an extruder 10 and is delivered thence through a downwardly directed crosshead tubing die 11 to a supercooling bath 12 of cold water, in conventional manner. The freshly extruded tube 13 is prevented from collapsing under the pressure of the bath 12 by an internal column of water 14 or other inert liquid which normally extends from a constriction in tube 13 caused by submerged pinch rolls 15 to a level near that of bath 12. The tube 13 may be dusted internally, if desired, by passing dust laden air through a tube 16 through die 11 and discharging the air through another tube 17. The tube 13, 19 is collapsed as it passes rolls 15 and remains flattened as it passes guide roll 18 and emerges from the bath 12. As illustrated, the flattened and supercooled tube 19 moves over guide roll 20 and thence through the nip of pinch rolls 21 and is forwarded through another set of pinch rolls 22. Between rolls 21 and 22, orientation is effected by means of an entrapped air bubble of such volume that the introduction of more air results in no further radial increase in the size of the tube but causes, instead, an elongation of the enlarged bubble in the direction toward rolls 21. Rolls 22 are driven at a greater speed than rolls 21, and the pellicular tube 23 approaching rolls 22 has been stretched in both major directions nearly as fully as possible, and is in an oriented crystalline condition. After leaving rolls 22, the flattened oriented tube 23 may be taken past a pair of knives 24 positioned to trim the folded edges from the tube, forming two flat sheets 25 which are illustrated as being wound together on a drum or core 26. The tubular film 19, prior to its orientation, is illustrated as passing through a circular housing 27 positioned about the tubular film between pinch rolls 21 and the stretching zone "A." Housing 27 has a cylindrical partition 28 dividing it into two concentric but intercommunicating chambers 29, 30. Dust laden air is supplied to the inner chamber 29 tangentially through one or more tubes 31. Part of the dust is deposited evenly on the tube wall, and the air and remaining dust pass around the ends of or through perforations in partition 28 into outer chamber 30 and through outlet 32 to an exhaust system, not shown.

Figure 3:
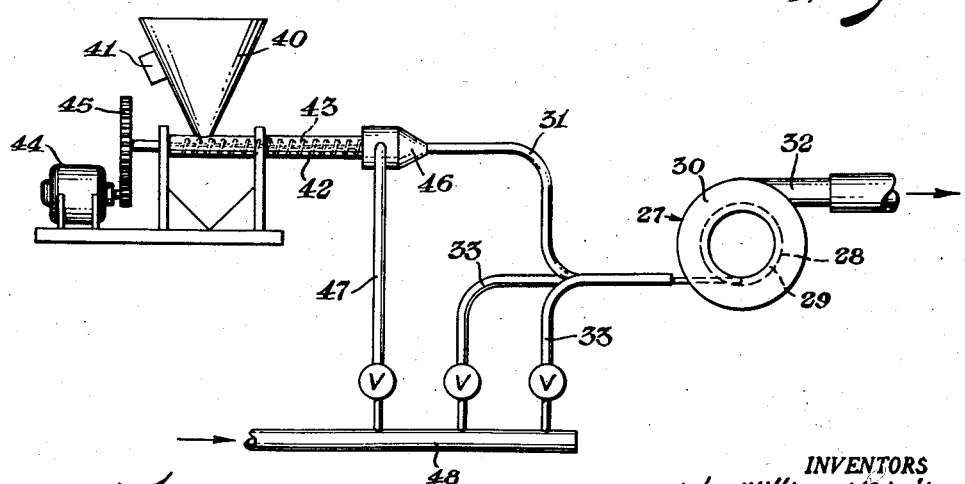

Figs. 2 and 3 illustrate a dusting apparatus to which dust is supplied through a hopper having an externally mounted vibrator 41. The dust is delivered to the barrel 42 of a worm conveyor, the worm 43 of which is driven as by variable speed motor 44 through reducing gears 45. Worm 43 delivers the dust at a controlled and steady rate axially to the large end of an enclosed cone 46 to which air is fed tangentially near the same large end, through tube 47. The resulting stream of dust and air emerges from the small end of cone 46 through tube 31 and is discharged tangentially in the inner chamber 29 of the film dusting housing 27, where the dust carrying stream may be diluted and distributed about film 19 by supplemental air streams admitted tangentially to chamber 29 through tubes 33. The several air lines 33, 47 may be valved, and they may be supplied conveniently from a common header 48. Air and residual dust are exhausted through outlet 32.

The amount of dust necessary to secure the desired advantage on the film varies somewhat according to the nature of the dust, the nature of the film, and the existing or anticipated atmospheric conditions affecting the electrostatic propensities of the film. When treating normally crystalline vinylidene chloride polymer films with powdered starch, amounts of starch deposited on the film for satisfactory results are generally in the range from 2 to 8 milligrams for each 100 square inches of treated surfaces area. In a specific example of such practice, the film being made was composed of a copolymer of about 85 percent vinylidene chloride and 15 percent vinyl chloride, and had a thickness of 0.0005 inch after the described orientation procedure. The tubular supercooled copolymer was dusted externally, as described, with enough micropulverized starch to leave about 4 milligrams on each 100 square inches of the subsequently oriented film. The tubular film was flattened and trimmed, as described, and the resulting sheets were double wound on a metal core. After storage for 3 months at room temperature, the film was unwound from the core and found to lie flat and straight, with no evidence of "bag and sag," and could be used easily in packaging machines. When the same type of film was made in the same manner, but with no dusting preceding the orientation, the double wound sheets gave evidence of irregular shrinkage and would not lie flat on a plane after storage of only a few weeks on a core which had been wound initially under the same tension as the other. Such baggy film could not be used successfully in packaging machines.

This application is a division of our copending application Serial No. 568,855, filed March 1, 1956 and now abandoned.

We claim:

Apparatus for dusting organic thermoplastic film in tubular form during its production which comprises a cylindrical housing having an axial passageway for moving tubular film, concentric intercommunicating chambers in said housing, means for delivering dust laden air at a steady rate tangentially to the inner such chamber for contact with tubular film moving therethrough, and means for exhausting air from the outer such chamber.

No references cited.